March 3, 1964 H. NEUHAUS 3,123,710
MECHANICAL MOTION AND X-RAY SPECTROGRAPHIC
APPARATUS INCORPORATING IT
Filed Dec. 8, 1960 4 Sheets-Sheet 1

INVENTOR.
HERMANN NEUHAUS
BY Hoffman Stone
Frank C. Parker
ATTORNEYS

March 3, 1964

H. NEUHAUS 3,123,710

MECHANICAL MOTION AND X-RAY SPECTROGRAPHIC
APPARATUS INCORPORATING IT

Filed Dec. 8, 1960

INVENTOR.
HERMANN NEUHAUS

BY Hoffman Stone
Frank C. Parker

ATTORNEYS

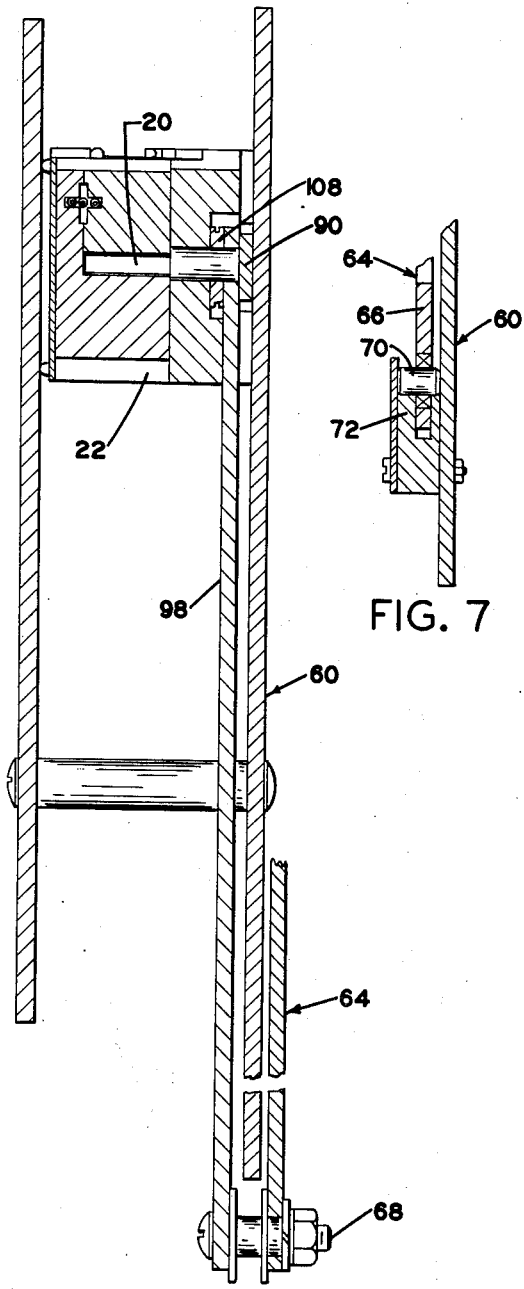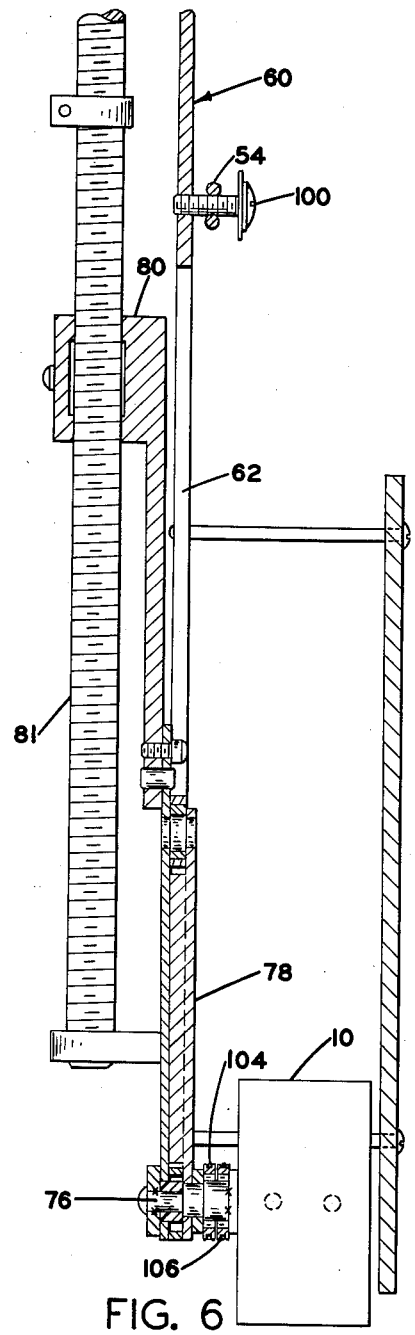

United States Patent Office 3,123,710
Patented Mar. 3, 1964

3,123,710
MECHANICAL MOTION AND X-RAY SPECTRO-
GRAPHIC APPARATUS INCORPORATING IT
Hermann Neuhaus, La Crescenta, Calif., assignor to
Applied Research Laboratories, Inc., Glendale, Calif.,
a corporation of Delaware
Filed Dec. 8, 1960, Ser. No. 74,704
11 Claims. (Cl. 250—51.5)

This invention relates to an improved mechanical motion for producing circular travel, and, more particularly, but not limited to an improved mechanical motion of this type especially adapted for use in X-ray diffraction apparatus.

There are many instances where it is desired to produce motion along a circular path about an inaccesible center, and to produce motion along other curved paths of relatively complex shape. One such instance is in certain focusing type X-ray spectrographic instruments such as X-ray monchromators in which it is desired to move an X-ray diffraction crystal along a rectilinear path relative to a fixed point, and simultaneously to move a detector device along a lemniscate curve having its origin at the same fixed point. The travel of the detector and the crystal in instruments of this type must be accurately controlled and synchronized in order to achieve optimum performance.

Accordingly, one important object of the present invention is to provide a novel mechanical arrangement for producing circular motion about an inaccessible center.

Other objects are: to provide a novel mechanical arrangement for producing accurately controllable motion along a curved path with other than circular curvature; to provide a novel mechanical motion for use in a focusing type X-ray monochromator; to provide an improved mechanical motion especially adapted for use in a curved crystal type X-ray diffraction apparatus to maintain the focal relationships between the source of X-rays, the diffraction crystal, and the detector throughout the entire scanning movement of the apparatus; to provide an improved mechanical motion of this type, which, in effect, causes the focal circle to roll around the X-ray source as a center while the diffraction crystal travels along a straight line path relative to the source; to provide an improved mechanical motion of this type which is of relatively simple and inexpensive construction, uses a minimum number of parts, may be relatively easily made to a high degree of accuracy and precision, and which is highly accurate in operation, yet rugged and long-lasting in service.

The foregoing and other objects and advantages of the invention will become apparent in the following description of a presently preferred embodiment thereof, taken in conjunction with the drawings wherein:

FIG. 2a is a schematic diagram illustrating one form of linkage according to the invention for producing circular motion;

FIG. 5 is a cross-sectional view taken along the line 5–5 of FIG. 4;

FIG. 6 is a sectional view taken along the line 6–6 of FIG. 4;

FIG. 7 is a fragmentary cross-sectional view taken along the line 7–7 of FIG. 3.

Figure 1:
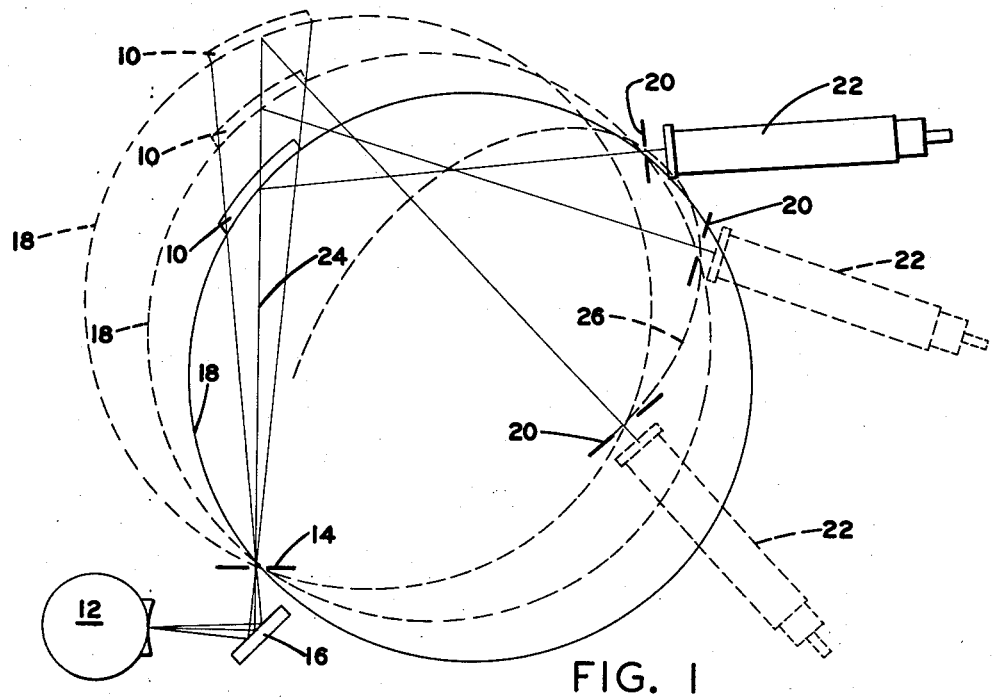
FIG. 1 is a schematic diagram of an X-ray monochromator of the curved crystal type, illustrating the motions of the crystal and the detector relative to the source of X-rays.

In the embodiment of the invention described herein, circular motion is produced about an inaccessible center by a rectilinear drive along a line passing through the center. The circular motion thus produced is used in conjunction with the rectilinear drive to produce the desired final motions of the X-ray detector and the diffraction crystal.

In a focusing type X-ray monochromator of the kind, for example, described in an article at page 20 of Design News for August 31, 1959, the diffraction crystal moves along a straight path relative to the entrance slit or other source of polychromatic X-rays and at the same time rotates upon an axis normal to its path. The exit slit and detector are mounted together and move along a lemniscate curve, at the same time rotating about an axis normal to the plane of the curve. The motions are synchronized so that for all positions, the crystal surface is coincident with the focal circle and is located midway between the entrance and exit slits, and the entrance and exit slits both lie on the focal circle.

In such instruments it is usually desirable to hold the entrance slit fixed, and to move both the crystal and the exit slit. Since it is desired to move the crystal along a straight line relative to the entrance slit, the motion of the exit slit becomes a lemniscate, and, in effect, the focal circle must roll about the entrance slit as a center.

The mechanical motion of the invention utilizes the geometrical theorem that states that the angle subtended by a chord at the circumference of a circle is one half the angle subtended by the same chord at the center of the circle. In the embodiment of the invention described herein, the base of an isosceles triangle link constitutes the chord, and the apex of the link lies at the center of the circle. The opposite ends of the base are constrained to move along straight line paths angularly inclined to each other at an angle equal to one half the apex angle of the isosceles triangle. As the link moves with the ends of its base so constrained, the apex of the link travels along a circular path centered upon the point of intersection of the two straight line paths.

The apex of the triangle link then represents the center of the focal circle, and the triangle link is used for controlling the rotation of the crystal and for maintaining the exit slit on the focal circle.

Similar circular motion may be generated as shown schematically in FIG. 2a, by a straight link 9 having its opposite ends 11 and 13 slidable along respective ways 15 and 17 arranged at right angles to each other. In this case, the mid-point 19 of the link 9 corresponds to the apex of the triangle link, and describes a circular path 21 centered on the point of intersection of the ways. Such an arrangement merely constitutes a special limiting case of the general theorem, in which the apex angle becomes 180°. However, a more compact construction, and equal accuracy may be achieved by the use of the triangle link, without appreciable added expense, and primarily for this reason, the triangle link arrangement is preferred for most applications.

The lemniscate travel of the exit slit is achieved by a combination of three controls. First, the exit slit is pivoted at the outer end of a radius link, the inner end of which is pivoted at the apex of the isosceles triangle link.

The exit slit is also slidable along a slide bar, which is pivoted at the end point of the base of the triangle where the crystal is mounted. The travel of the exit slit along the slide bar is controlled by a constant length cable, which is trained around a pair of pulleys at the crystal position.

The use of a constant length cable presents problems in this situation because varying lengths of the cable are taken up on the pulley depending upon the angular orientation of the slide bar relative to the crystal. This is ingeniously resolved by the double pulley arrangement of the invention. The cable is arranged in two flights, which are trained in opposite respective directions around the two coaxially pivoted pulleys so that as one flight is taken up on its pulley the other flight is let off. Highly precise and accurate control of the detector position is achieved by this arrangement at relatively low cost.

Although the invention was originally developed in connection with work on X-ray spectrometers, or monochromators and similar apparatus, it is not limited thereto, but may be equally advantageous for use in other devices where similar types of motion are desired, particularly where circular travel is desired around an inaccessible center.

To facilitate an understanding of the functioning of the mechanical motion of the invention, reference will first be made to FIGS. 1 and 2, which illustrate the desired motions of the various elements of the monochromator, and the structure of the invention in schematic form.

In FIG. 1, the curved crystal 10 is shown arranged for receiving fluorescent X-radiation emitted from a specimen 16 in response to X-ray irradiation from an X-ray generator 12 and passing through an entrance slit 14. The X-rays it is desired to detect are focused by the crystal 10 on the focal circle 18 at a distance from the crystal 10 equal to the distance from the crystal 10 to the entrance slit 14. The exit slit 20, therefore, must be positioned on the focal circle 18 to receive the focused X-rays for all positions of the crystal 10 relative to the entrance slit 14. The spacing between the crystal 10 and the entrance slit 14 determines the wavelength of the X-rays that are focused by the crystal 10. The intensity of the X-radiation passing through the exit slit 20 is measured by the detector 22, which is positioned immediately behind the exit slit and travels with it.

To scan the spectrum, the spacings between the crystal 10 and the two slits 14 and 20 must be varied. For optimum accuracy, it is desirable to move the crystal 10 along a straight line path 24 toward and away from the entrance slit 14. In order to maintain the proper focal relationship, that is, to keep the exit slit 20 always in position to receive the focused X-ray image, the exit slit 20 must travel along a leaf-shaped path 26, commonly described as a lemniscate, relative to the entrance slit 14. In effect, the focal circle 18 rolls about the entrance slit 14. The focal circle must at all times pass through both the entrance slit and the exit slit, and lie along the surface of the crystal 10. The focal circle 18 is intangible, and in the actual apparatus of the invention is not represented by physical structure.

Figure 2:
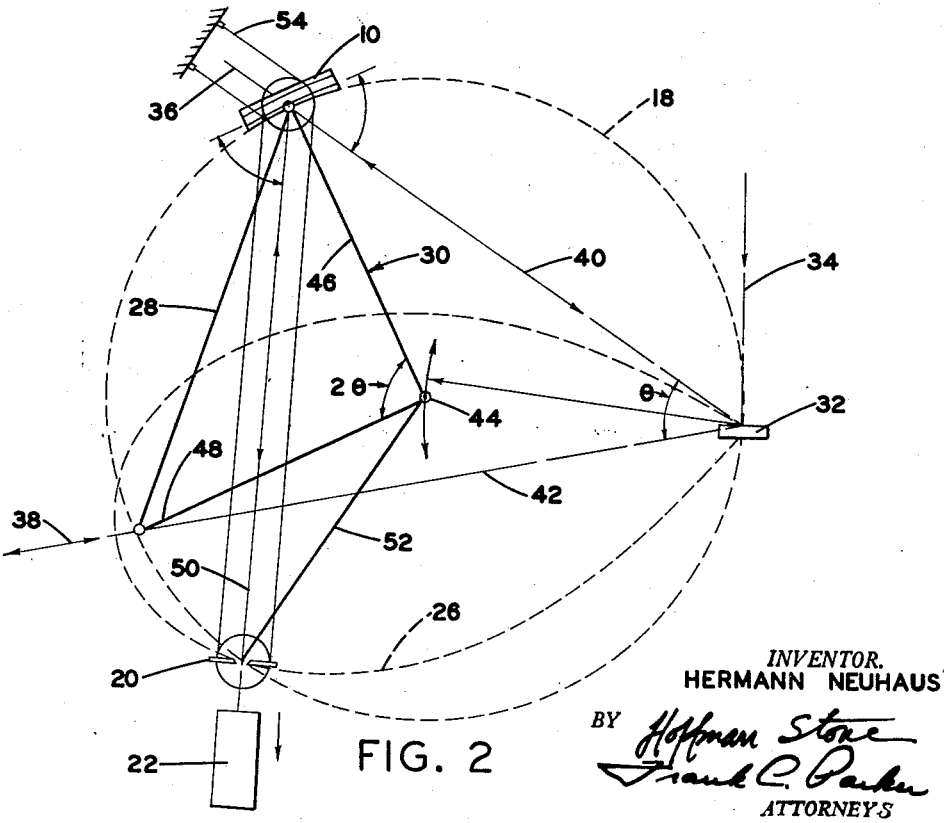
FIG. 2 is a schematic diagram of a curved crystal type X-ray monochromator including a mechanical motion according to the invention.
Figure 3:
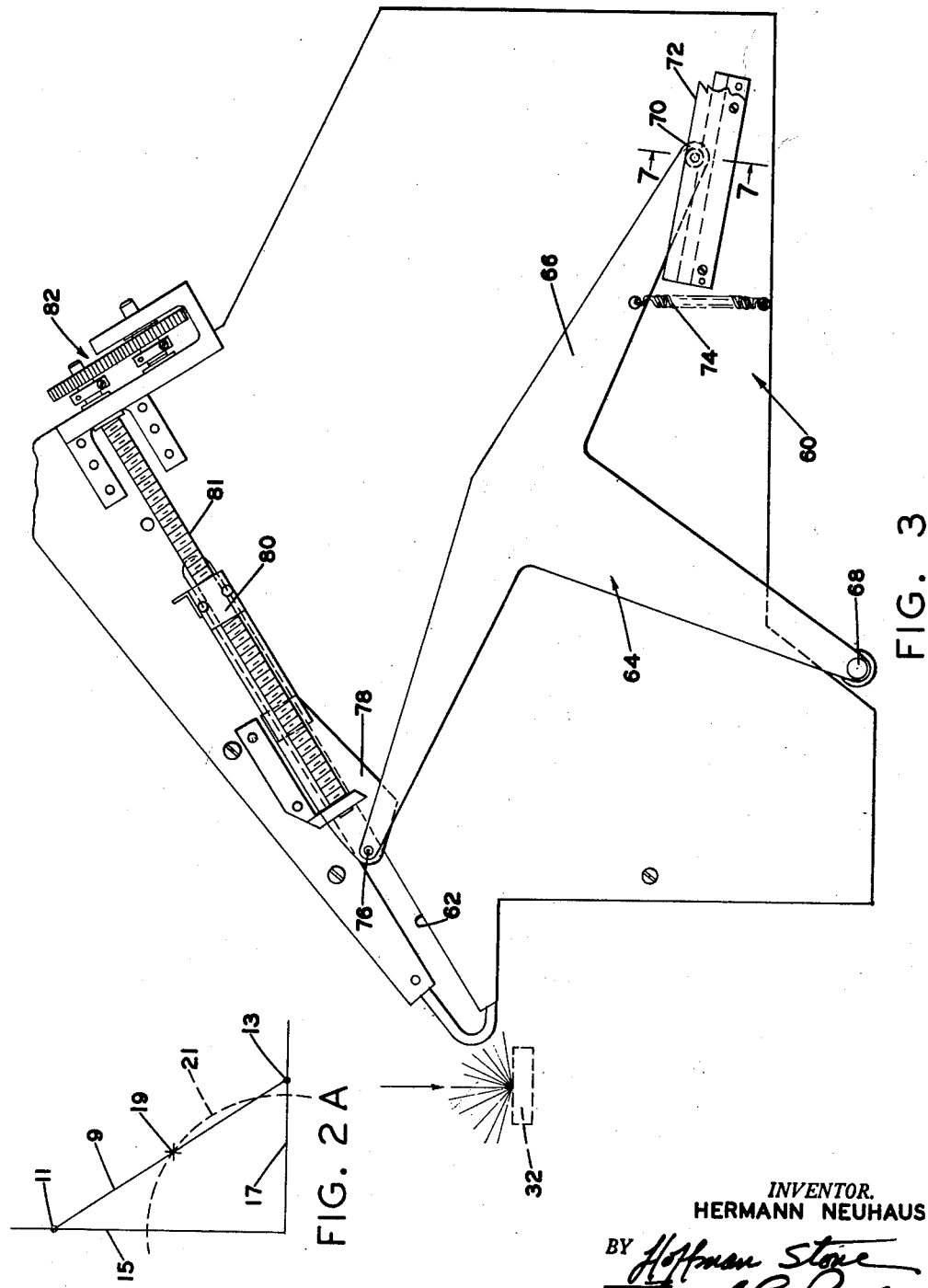
FIG. 3 is a side elevational view of an X-ray monochromator according to a preferred embodiment of the invention.
Figure 4:
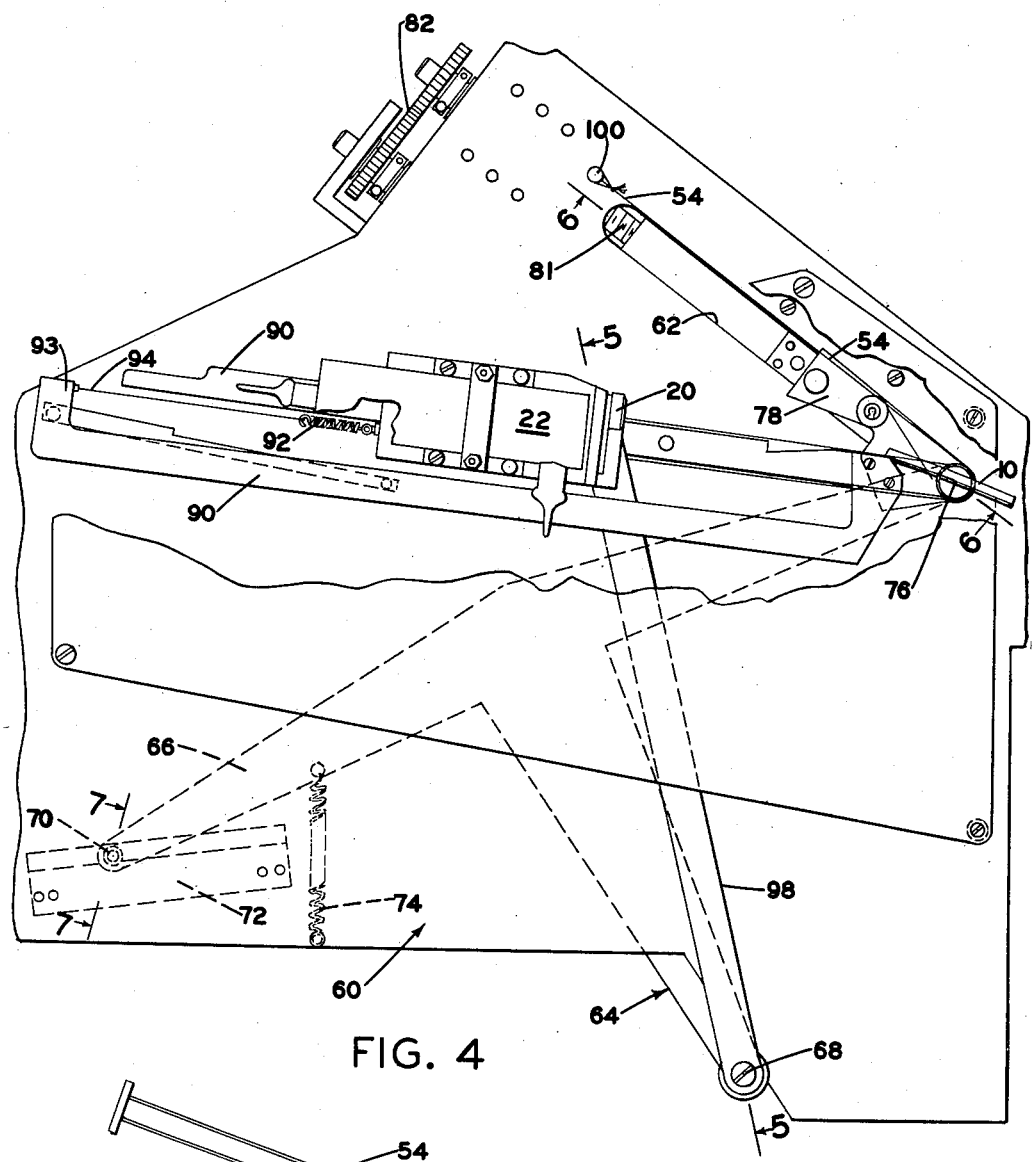
FIG. 4 is a fragmentary side elevational view of the monochromator taken from the opposite side from FIG. 3.
Figure 8:
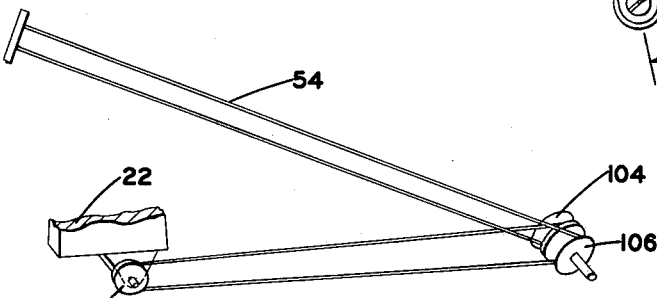
FIG. 8 is a partly schematic, perspective view of the constant length cable arrangement as used in the monochromator shown in FIGS. 3–7.

An X-ray monochromator including a mechanical motion according to the presently preferred embodiment of the invention is shown schematically in FIG. 2, wherein the crystal 10 is shown mounted at one end of the base 28 of an isosceles triangle link 30 for receiving X-radiation directly from a specimen 32. A selected surface portion of the specimen 32 is, in this embodiment, rendered X-ray emissive by bombardment by an electron beam 34. The opposite ends of the base 28 of the triangle are constrained to move along tracks 36 and 38 respectively, which are aligned in a common plane along lines 40 and 42, respectively, which intersect at the selected surface portion of the specimen 32 under bombardment. The tracks 36 and 38 are angularly offset relative to each other at an angle $\theta$ equal to one half the apex angle of the isosceles triangle link 30. The apex 44 of the isosceles triangle link thus constitutes the center of the focal circle 18, and the legs 46 and 48 of the isosceles triangle link are radii of the focal circle.

The exit, or secondary slit 20 is slidable along a slide bar 50, which is pivoted on the triangle link 30 at the same end of its base 28 where the crystal 10 is mounted. The detector 22 is fixed relative to the exit slit 20, and, together with the exit slit 20 is movabe along the slide bar 50 toward and away from the crystal 10. The exit slit 20 is maintained on the focal circle 18 by a radius link 52, the opposite ends of which are pivoted, respectively, at the apex 44 of the triangle link and at the exit slit 20.

Travel of the exit slit 20 toward and away from the crystal 10 is controlled by a constant length cable 54, both ends of which are anchored relative to the specimen 32 at a point adjacent to the track 36 along which the crystal 10 travels and farther from the specimen 32 than the farthest limit of travel of the crystal 10. The detector 22 and the exit slit 20 are biased by any desired means (not shown in FIG. 2) away from the crystal 10. The cable 54 acts against the biasing means to maintain the distance between the crystal 10 and the exit slit 20 always exactly equal to the distance between the crystal 10 and the specimen 32. The detailed arrangement and operation of the cable 54 will be described in greater detail hereinafter in connection with the other figures of the drawing.

In operation, one end of the base 28 of the triangle link is driven along its track 36 or 38 to cause the crystal 10 to move along the straight line path 40 toward or away from the specimen 32. The triangle link 30, together with the radius link 52 and the constant length cable 54 then operates to maintain the proper focal relationships between the specimen 32, the crystal 10, and the exit slit 20 as hereinabove described, causing the exit slit 20 to follow the lemniscate path 26.

So much for the schematic showings. The construction of an actual X-ray monochromator according to the invention is illustrated in FIGS. 3–8. The monochromator includes a main plate 60 upon which the movable parts are supported. The straight line path 40 (FIG. 2) along which the crystal 10 travels is defined by a slot 62 in the plate 60. The triangle link is in the form of a T-bar 64. The cross 66 of the T-bar constitutes the base of the isosceles triangle, and the tip 68 of the staff is its apex. One end of the cross 66 carries a roller 70, best seen in FIG. 7, which rides in a track 72 fixed on the plate 60 at a 45° angle relative to the slot 62. The roller 70 is held in the track 72 by a tension spring 74 connected between the cross 66 and the plate 60.

The T-bar 64 in this instance is constructed to define a right isosceles triangle. If the apex angle of the isosceles triangle is different from 90°, the track 72 is adjusted accordingly so that the angle between it and the slot 62 is one half the apex angle of the isosceles triangle link 64.

A pivot 76 is fixed to the end of the cross 66 opposite from the roller 70, and projects through the slot 62. The pivot 76 is rotatable in a slide 78, which is mounted for smoothly guided travel along the slot 62. The crystal 10 is fixed at the end of the pivot 76, so that it rotates with the triangle link 64, and is always coincident with the focal circle 18, the center of which is at the apex 68 of the triangle link 64. The slide 78 is secured to a follower nut 80 for translational drive along the slot 62 in response to rotation of a drive screw 81, which is engaged by the follower nut 80, and which is mounted adjacent and parallel to the slot 62. The screw 81 is drivable by any desired means such as, for example, an electric motor (not shown) connected through the gear train 82.

The secondary slit 20 and the detector 22 are mounted as a common assembly upon a slide bar 90, which is pivoted upon the pivot 76 at the crystal position. The detector and secondary slit are urged away from the crystal 10 by a constant tension spring 92, one end of which is secured to the detector 22, and the opposite end of which is secured to an anchor 93. The anchor 93 may be fixed at the outer end of the slide bar 90, or, as shown, may be in the form of an auxiliary bar, which is fixed to the slide bar 90 near the pivoted end thereof, and which extends to a point adjacent to the outer end of the slide bar 90.

The secondary slit 20 is maintained on the focal circle by a radius link 98, the opposite ends of which are pivoted respectively at the apex point 68 of the triangle link and at the secondary slit 20.

The travel of the secondary slit 20 and the detector 22 along the slide bar 90 is controlled by the constant length cable 54, which works against the constant tension spring 92. Both ends of the cable 54 are anchored upon a pin 100, which is fixed on the main plate 60 at a point generally in line with the path of travel of the crystal 10 and spaced beyond the extreme limit of travel of the crystal 10 away from the X-ray source 32. The two flights of the cable are trained, respectively, around two pulleys 104 and 106, which are separately pivoted upon the pivot 76. The two flights of the cable 54 are trained in opposite respective directions around their respective pulleys 104 and 106. The bight portion of the cable 54 passes over an idler pulley 108 (FIG. 8) which is pivoted upon the secondary slit 20 and detector 22 assembly.

The cable 54, in conjunction with the biasing spring 92 operates to maintain the secondary slit 20 always spaced from the crystal 10 a distance equal to the spacing of the crystal 10 from the X-ray source 32. Variations due to changes in the amount of the cable 54 taken up by either one of the pulleys 104 and 106 are exactly compensated for by equal and opposite changes in the length of the cable taken up by the other one of the two pulleys as the angular position of the slide bar 90 changes relative to the crystal 10.

The use of a constant tension spring or other constant force biasing means for urging the detector 22 and slot 20 away from the crystal 10 and thereby tensioning the cable 54 avoids inaccuracies that might otherwise be introduced by changes in the length of the cable 54 such as may be caused by changes in its loading.

The X-ray monochromator of the invention is thus seen to be of relatively simple, and compact construction and to be relatively inexpensive to manufacture since only straight line dimensions need be controlled. The use of expensive cams of difficultly machinable shapes, or of curved tracks or guideways is avoided, as is also the use of gears for controlling the relative motions of the parts. The required motions are all based upon straight line movements, and are achieved by the combination of two principal devices, first the isosceles triangle link 64, and, second, the constant length cable 54. These two devices cooperate to move the secondary slit 20 along the lemniscate path in response to a simple translational drive.

What is claimed is:

1. Scanning type diffraction apparatus including a mechanical linkage for producing circular motion about a pre-selected center, said linkage comprising a pair of straight ways angularly offset relative to each other and lying along respective lines that pass through the selected center, an isosceles triangle link having an apex angle equal to twice the angular offset between said ways, and means securing the ends of the base of said triangle link for travel along respective ones of said ways, whereby the apex of said triangle link follows a circular path as the base thereof moves along said ways.

2. Scanning type diffraction apparatus including a mechanical linkage for producing circular motion about a pre-selected center, said linkage comprising a pair of straight ways angularly offset 45° relative to each other and lying along respective lines that pass through the selected center, a link having three points arranged respectively at the corners of a right isosceles triangle, means securing said link at the two of said points at the base of the triangle for travel along said ways, whereby the point at the apex of the triangle follows a circular path about the selected center as said link moves along said ways.

3. In a tension drive apparatus of the type wherein a pivot is movable along a straight guideway and it is desired to drive a movable element toward and away from the pivot along a path angularly displaced from the guideway, the angular displacement between the path and the guideway being variable responsively to the travel of the pivot, the apparatus including a flexible tension member extending partly along the guideway, around the pivot, and thence to the movable element, the improvement comprising a second pivot mounted on the movable element, a flexible tension member trained around said second pivot and extending therefrom in two flights, said flights being trained in opposite respective directions around the first mentioned pivot and extending in the same direction therefrom along the guideway, whereby the same length of said tension member is taken up by the first mentioned pivot at all angular positions of the movable element relative thereto.

4. A tension drive device comprising a first guideway, a pivot movable along said guideway, a second guideway pivoted upon said pivot, an element movable in translation along said second guideway, biasing means for yieldably urging said element away from said pivot, an elongated tension member, means for securing both ends of said tension member adjacent to said first guideway, a second pivot on said element, the bight of said tension member being passed around said second pivot, and the opposite flights of said tension member being trained in opposite respective directions around said first mentioned pivot, whereby the same total length of said tension member is taken up by said first pivot at all angular positions of said second guideway thereabout.

5. A mechanical motion for use in scanning type diffraction apparatus or the like for moving a member along a curved path conforming generally to a lemniscate comprising first and second guideways angularly offset relative to each other and arranged along respective lines that intersect at a selected point, a link having an apex point equidistant from its opposite ends, the angle subtended at said apex point by said opposite ends being twice the angle between said guideways, means securing the respective ends of said link for smoothly guided travel along said guideways whereby said apex point is restrained to follow a circular path, drive means for driving one end of said link in translation along its guideway, first pivot means at one end of said link, a third guideway pivoted on said pivot means, an element movable along said third guideway, a radius link connected between said element and said apex point, second pivot means on said element, an elongated tension member trained around said second pivot means and extending therefrom in two flights, said flights being trained in opposite respective directions around said first pivot means, and means for anchoring both ends of said tension member at a common point adjacent to the path of travel of said first pivot means.

6. A scanning X-ray spectrometer, monochromator, or the like of the type having a curved diffraction element for forming a focused image of a source of X-radiation at a selected point along a focal circle comprising a supporting plate, means on said plate defining two straight guideways angularly offset from each other at an acute angle, an isosceles triangle link having an apex angle equal to twice said acute angle, means for mounting the opposite ends of the base of said link for smoothly guided travel along respective ones of said guideways with the apex of said link extending in the direction of convergence of said guideways, a first pivot fixed to said link at one end of the base thereof, an X-ray diffraction element fixed to said pivot, said diffraction element being of the focusing type and having a curved surface lying along a circle centered at the apex of said link, an auxiliary guideway pivoted on said first pivot, means defining a slit movable along said auxiliary guideway, a radius link pivotally connected between said slit means and the apex of said isosceles triangle link for spacing said slit means from the apex of said triangle link a distance equal to the spacing of said diffraction element therefrom, yieldable biasing means for urging said slit means away from said first pivot, a flexible tension member for positioning said slit means along said auxiliary guideway against the urging of said biasing means, said tension member being trained around an idler pivot on said slit means and extending therefrom in two flights, said flights being trained around said first pivot in opposite respective directions, means anchoring both ends of said tension member upon said supporting plate at a point thereon adjacent to the guideway along which said first pivot travels and beyond the farthest point of travel in the divergent direction of said first pivot, and drive means for driving one end of the base of said triangle link along its guideway.

7. A mechanical motion for moving a member along a curved path conforming generally to a lemniscate comprising first and second guideways angularly offset relative to each other and arranged along respective lines that intersect at a selected point, a link having an apex point equidistant from its opposite ends, the angle subtended at said apex point by said opposite ends being twice the angle between said guideways, means securing the respective ends of said link for smoothly guided travel along said guideways whereby said apex point is constrained to follow a circular path, drive means for driving one end of said link in translation along its guideway, first pivot means at one end of said link, a third guideway pivoted on said pivot means, an element movable along said third guideway, a radius link connected between said element and said apex point for spacing said element from said apex point, and means for moving said element along said third guideway in response to travel of said link along said first and second guideways.

8. A mechanical motion for moving a member along a curved path conforming generally to a lemniscate comprising first and second guideways angularly offset relative to each other and arranged along respective lines that intersect at a selected point, a link having an apex point equidistant from its opposite ends, the angle subtended at said apex point by said opposite ends being twice the angle between said guideways, means securing the respective ends of said link for smoothly guided travel along said guideways whereby said apex point is constrained to follow a circular path, drive means for driving one end of said link in translation along its guideway, first pivot means at one end of said link, a third guideway pivoted on said pivot means, an element movable along said third guideway, a radius link connected between said element and said apex point for spacing said element from said apex point, and means for moving said element along said third guideway synchronously and equally with the travel of a selected one of the ends of said link.

9. A scanning X-ray spectrometer, monochromator, or the like of the type having a curved diffraction element for forming a focused image of a source of X-radiation at a selected point along a focal circle comprising a supporting plate, means on said plate defining two straight guideways angularly offset from each other at an acute angle, an isosceles triangle link having an apex angle equal to twice said acute angle, means for mounting the opposite ends of the base of said link for smoothly guided travel along respective ones of said guideways with the apex of said link extending in the direction of convergence of said guideways, a first pivot fixed to said link at one end of the base thereof, an X-ray diffraction element fixed to said pivot, said diffraction element being of the focusing type and having a curved surface lying along a circle centered at the apex of said link, an auxiliary guideway pivoted on said first pivot, means defining a slit movable along said auxiliary guideway, a radius link pivotally connected between said slit means and the apex of said isosceles triangle link for spacing said slit means from the apex of said triangle link a distance equal to the spacing of said diffraction element therefrom, means for driving said slit means along said auxiliary guideway in response to translation of said first pivot, and drive means for driving one end of the base of said triangle link along its guideway.

10. A scanning X-ray spectrometer, monochromator, or the like of the type having a curved diffraction element for forming a focused image of a source of X-radiation at a selected point along a focal circle comprising a supporting plate, means on said plate defining two straight guideways angularly offset from each other at an acute angle, an isosceles triangle link having an apex angle equal to twice said acute angle, means for mounting the opposite ends of the base of said link for smoothly guided travel along respective ones of said guideways with the apex of said link extending in the direction of convergence of said guideways, a first pivot fixed to said link at one end of the base thereof, an X-ray diffraction element fixed to said pivot, said diffraction element being of the focusing type and having a curved surface lying along a circle centered at the apex of said link, an auxiliary guideway pivoted on said first pivot, means defining a slit movable along said auxiliary guideway, a radius link pivotally connected between said slit means and the apex of said isosceles triangle link for spacing said slit means from the apex of said triangle link a distance equal to the spacing of said diffraction element therefrom, means for driving said slit means along said auxiliary guideway synchronously and equally with the travel of said first pivot, said driving means being arranged to drive said slit means toward said first pivot during travel of said pivot in the direction of convergence of said two straight guideways and to drive said slit means away from said first pivot during travel of said first pivot in the direction of divergence of said two straight guideways, and means for driving one end of the base of said triangle link along its guideway.

11. Scanning type diffraction apparatus including means defining a slit, a diffraction element, and means for moving said element and said slit means so that said element and said slit both remain upon the circumference of a given circle while the circle rolls about a selected point on its own circumference spaced from said slit and said diffraction element, said moving means comprising a pair of straight ways angularly offset relative to each other and lying along respective lines that pass through the selected point, a link having an apex point equispaced from its opposite ends, the angle subtended at said apex point by the opposite ends of said link being twice the angle between said ways, locating means securing the opposite ends of said link for travel respectively along said ways, means securing one of said slit means and said diffraction element at one end of said link, and a radius arm pivotally connected between said apex point and the other one of said slit means and said diffraction element for maintaining it upon the circle.

References Cited in the file of this patent

UNITED STATES PATENTS

| | | |
|---|---|---|
| 431,826 | Wagenen | July 8, 1890 |
| 466,114 | Braun | Dec. 29, 1891 |
| 2,898,469 | Rose | Aug. 4, 1959 |
| 2,933,813 | Day | Apr. 26, 1960 |
| 3,051,833 | Schumacher | Aug. 28, 1962 |

FOREIGN PATENTS

| | | |
|---|---|---|
| 540,266 | France | July 8, 1922 |
| 621,337 | Great Britain | Apr. 7, 1949 |